Patented May 23, 1950

2,508,471

UNITED STATES PATENT OFFICE 2,508,471

$\Delta^{4,5}$-3,11-DIKETO-17,20-DIHYDROXY-PREGNANES AND PROCESS

Lewis Hastings Sarett, Princeton, N. J., assignor to Merck & Co., Inc., Rahway, N. J., a corporation of New Jersey No Drawing. Application July 13, 1946, Serial No. 683,428

9 Claims. (Cl. 260—397.3)

This invention is concerned generally with novel chemical compounds of the cyclopentano-dimethylpolyhydrophenanthrene series and processes for preparing the same; in particular it relates to stereoisomers of $\Delta^{4,5}$-3,11-diketo-17,20-dihydroxy pregnene and acylated derivatives thereof and with methods of manufacturing these compounds from readily available starting materials. The new compounds thus produced are of value in the preparation of hormones having androgenic activity such as adrenosterone and for other purposes. They are also of value as a means of establishing the structure of other organic compounds.

These stereoisomeric $\Delta^{4,5}$-3,11-diketo-17,20-dihydroxy pregnenes and their acylated derivatives, subject of this application, can be represented by the following structural formula:

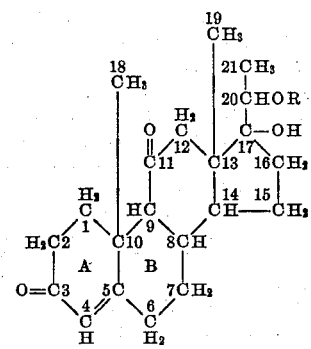

wherein R is hydrogen or acyl. This formula, for purposes of convenience, is hereinafter reproduced below in the abbreviated form:

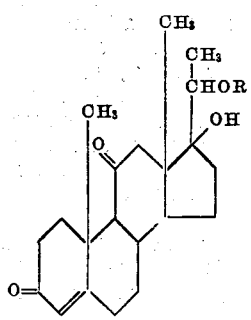

wherein R has the significance above defined.

In the following description of the invention, the stereochemical relationship of the substituents are indicated by the following convention:

(1) A substituent in the C17 position, the stereochemical configuration of which is identical to that of the naturally occurring adrenal hormones, is parenthetically designated "α"; the epimeric configuration is designated "β." In the structural formulae, the former configuration is shown by writing the C17 substituent (hydroxyl) to the right of the C17 carbon side chain thus:

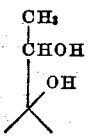

in the latter case above the side chain thus

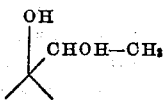

(2) The stereochemical relationship of rings A and B is indicated in the formulae by a solid line representing the valence bond in the cis configuration.

In accordance with the present invention, it is now found that stereoisomers of $\Delta^{4,5}$-3,11-diketo-17,20-dihydroxy pregnene and acylated derivatives thereof, can be synthesized, and said $\Delta^{4,5}$-3,11-diketo-17,20-dihydroxy-pregnene converted to adrenosterone by reactions indicated generically as follows:

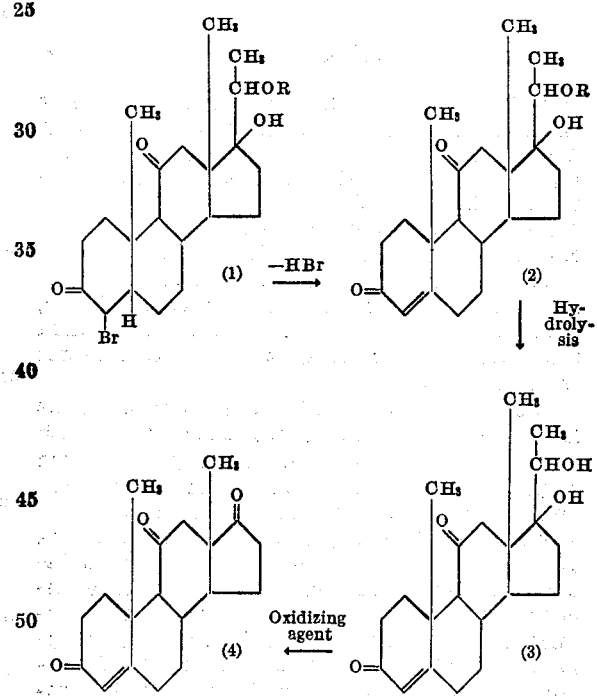

wherein R is acyl. The reactions indicated above are conducted as follows: The starting material, a stereoisomer of 4-bromo-3,11-diketo-17-hydroxy-20-acyloxy pregnene (1), which is prepared according to processes disclosed in my co-pending applications, Serial No. 605,194, filed July 14, 1944, now abandoned; Serial No. 687,982, filed August 2, 1946; Serial No. 683,427, filed July 13, 1946, now Patent No. 2,493,780; and Serial No. 673,890 filed June 1, 1946, is reacted with an agent capable of removing the elements of hydrogen bromide from the molecule to form the corresponding stereoisomer of Δ⁴,⁵-3,11-diketo-17-hydroxy-20-acyloxy pregnene (2); This compound is reacted with a hydrolyzing agent under saponifying conditions to produce a stereoisomer of Δ⁴,⁵-3,11-diketo-17,20-dihydroxy pregnene (3) which is reacted with an oxidizing agent to produce adrenosterone. (4).

In carrying out the reactions according to the presently invented process, the stereoisomeric 4 - bromo - 3,11 - diketo - 17-hydroxy-20-acyloxy pregnane is treated, for example by refluxing, with a compound capable of removing the elements of hydrogen bromide, as for example, a tertiary amine such as pyridine, quinoline, picoline and the like, causing the formation of the double bond in the 4,5 position.

According to a preferred embodiment of applicant's process, the starting material, 4-bromo-3,11 - diketo - 17 - (α)-hydroxy-20-acyloxy pregnane, is reacted directly, as for example by refluxing, with pyridine, to produce the desired Δ⁴,⁵-3,11-diketo-17(α)-hydroxy-20-acyloxy pregnene having the structural formula:

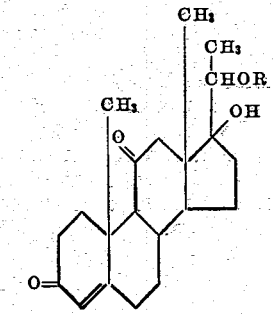

wherein R is acyl. The last mentioned product can be hydrolyzed by any convenient method, as for example, by reaction with an aqueous alkaline methanolic solution, whereby Δ⁴,⁵-3,11-diketo-17-(α)20-dihydroxy pregnene is obtained.

The product obtained at this stage is independent of the acyl group R in the starting material which can be any desired group derived for example from acetic, propionic, butyric, valeric, caproic, capric, benzoic, or toluic acid, of which the lower aliphatic acids, having 6 carbon atoms or less, are preferred.

The Δ⁴,⁵-3,11-diketo-17,20-dihydroxy pregnene isomers, or mixtures thereof is then reacted with a substantial excess of an oxidizing agent such as periodic acid, chromic acid, lead tetraacetate, and the like, preferably in solution in an inert solvent. When the preferred oxidizing agent, periodic acid is employed suitable solvents include aqueous methanol, aqueous ethanol, aqueous dioxane, and the like. It is preferred to conduct the reaction at about 20° C., employing approximately three molecular equivalents of periodic acid, under which conditions the time required for the oxidation is approximately 5 hours, but higher or lower temperatures may be employed if desired. Independent of the stereoisomeric configuration of the hydroxyl groups attached to the 17 and 20 carbon atoms, the product obtained by oxidation is Δ⁴,⁵-3,11,17-triketoetiocholane, known as adrenosterone. This product can be represented by the following structural formula:

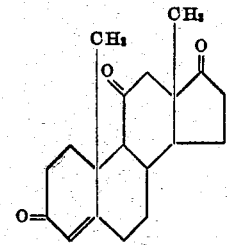

The product is recovered from the reaction mixture in any convenient way, as for example, by diluting the same with water and extracting the adrenosterone product with a solvent such as chloroform, from which the adrenosterone is recovered in crude form by evaporation. The crude product can be purified by conventional methods as for example, by recrystallization from a solvent such as ethyl alcohol, by chromatographic absorption, or sublimation.

The following example illustrates a method of carrying out the present invention, but it is to be understood that this example is given by way of illustration and not of limitation.

*Example*

About 700 mg. of 4-bromo-3,11-diketo-17-(α)-hydroxy-20-acetoxy pregnane is dissolved in about 20 cc. of dry pyridine and the solution heated to reflux for approximately 8 hours. The pyridine is evaporated under reduced pressure, the residual material is dissolved in chloroform and the chloroform extract washed successively with dilute aqueous hydrochloric acid, aqueous sodium bicarbonate solution and finally with water. The chloroform extract is then evaporated to dryness under reduced pressure and the residue purified by dissolving in about 2 cc. benzene, adding about 30 cc. absolute ether and filtering off the flocculent precipitate which forms. The filtrate is then evaporated to dryness and the product recrystallized several times from ether to produce substantially pure Δ⁴,⁵-3,11-diketo-17-(α)-hydroxy-20-acetoxy-pregnene; M. P. 218–219° C. (corr.).

About 64 mg. of Δ⁴,⁵-3,11-diketo-17(α)-hydroxy-20-acetoxy pregnene is dissolved in about 5 cc. of methanol and a solution containing about 60 mg. of potassium bicarbonate, 100 mg. of potassium carbonate and about 2 cc. of water is added thereto. The resulting solution is allowed to stand at about 20° C. for approximately 15 hours, the solution is evaporated to a small volume under reduced pressure and is then extracted with chloroform. The chloroform extract is washed with water and is then evaporated to dryness and the crude material thus obtained is purified by recrystallization from cold aqueous acetone to produce substantially pure Δ⁴,⁵-3,11-diketo-17(α)-20-dihydroxy-pregnene hydrate; M. P. 108–110° C. (corr.).

About 85 mg. of Δ⁴,⁵-3,11-diketo-17-(α)-20-dihydroxy pregnene is dissolved in about 2 cc. of 80% methanol and about 150 mg. of periodic acid added thereto. The resulting solution is allowed to stand at room temperature for approximately 5 hours, water is added thereto and the mixture is then extracted with chloroform. The chloroform extract is evaporated to dryness and the residual material recrystallized from alcohol to produce substantially pure adrenosterone; M. P. 221–223° C. (corr.). If desired, the crude residue above can be purified by chromatographic absorption or sublimation prior to recrystallization from alcohol.

Various changes and modifications may be made in my process as described without departing from the scope of my invention. To the extent that these changes and modifications are within the purview of the annexed claims, they are to be considered as part of my invention.

I claim:

1. The process of preparing adrenosterone which comprises reacting 4-bromo-3,11-diketo-17-hydroxy-20-acyloxy pregnane with a tertiary amine to remove the elements of hydrogen bromide from the molecule to form the corresponding $\Delta^{4,5}$-3,11-diketo-17-hydroxy-20-acyloxy pregnene; hydrolyzing this compound to the corresponding 17,20-dihydroxy derivative; and reacting the resulting $\Delta^{4,5}$-3,11-diketo-17,20-dihydroxy pregnene with approximately three molecular equivalents of an oxidizing agent to produce adrenosterone.

2. The process of preparing adrenosterone which comprises reacting 4-bromo-3,11-diketo-17-($\alpha$)-hydroxy-20-acetoxy pregnene with pyridine to remove the elements of hydrogen bromide from the molecule to form $\Delta^{4,5}$-3,11-diketo-17-($\alpha$)-hydroxy-20-acetoxy pregnene; reacting this compound with an alcoholic solution containing an alkali metal carbonate to effect saponification of the ester grouping to produce $\Delta^{4,5}$-3,11-diketo-17($\alpha$),20-dihydroxy-pregnene; and reacting this compound with approximately three molecular equivalents of periodic acid to produce adrenosterone.

3. The process which comprises reacting $\Delta^{4,5}$-3,11-diketo-17,20-dihydroxy pregnene with approximately three molecular equivalents of an oxidizing agent to produce adrenosterone.

4. The process which comprises reacting $\Delta^{4,5}$-3,11-diketo-17-($\alpha$)-20-dihydroxy pregnene with approximately three molecular equivalents of periodic acid to produce adrenosterone.

5. 20-substituted-$\Delta^{4,5}$-3,11-diketo-17-hydroxy-pregnenes in which the substituent in the 20-position is a radical selected from the class which consists of hydroxy and lower aliphatic carboxylic acyloxy radicals.

6. $\Delta^{4,5}$-3,11-diketo-17-($\alpha$)-hydroxy-20-acetoxy pregnene, having a melting point of about 218–219° C.

7. $\Delta^{4,5}$-3,11-diketo-17-($\alpha$)-20-dihydroxy pregnene hydrate, having a melting point of about 108–110° C.

8. The process of preparing $\Delta^{4,5}$-3,11-diketo-17,20-dihydroxy-pregnene which comprises reacting 4-bromo-3,11-diketo-17-hydroxy-20-acyloxy-pregnane with a tertiary amine to remove the elements of hydrogen bromide from the molecule to form the corresponding $\Delta^{4,5}$-3,11-diketo-17-hydroxy-20-acyloxy-pregnene and hydrolyzing this compound to form said $\Delta^{4,5}$-3,11-diketo-17,20-dihydroxy-pregnene.

9. The process of preparing $\Delta^{4,5}$-3,11-diketo-17($\alpha$),20-dihydroxy-pregnene which comprises reacting 4-bromo-3,11-diketo-17($\alpha$)-hydroxy-20-acetoxy-pregnane with pyridine to remove the elements of hydrogen bromide from the molecule to form $\Delta^{4,5}$-3,11-diketo-17($\alpha$)-hydroxy-20-acetoxy-pregnene and reacting this compound with an alcoholic solution containing an alkali metal carbonate to effect saponification of the ester grouping to produce said $\Delta^{4,5}$-3,11-diketo-17($\alpha$),20-dihydroxy-pregnene.

LEWIS HASTINGS SARETT.

REFERENCES CITED

The following references are of record in the file of this patent:

UNITED STATES PATENTS

| Number | Name | Date |
| --- | --- | --- |
| 2,153,700 | Serini | Apr. 11, 1939 |
| 2,239,742 | Serini | Apr. 29, 1941 |
| 2,254,562 | Bockmuhl | Sept. 2, 1941 |
| 2,389,325 | Reichstein | Nov. 20, 1945 |